(12) United States Patent
Bäurle

(10) Patent No.: US 9,602,009 B1
(45) Date of Patent: Mar. 21, 2017

(54) LOW VOLTAGE, CLOSED LOOP CONTROLLED ENERGY STORAGE CIRCUIT

(71) Applicant: Power Integrations, Inc., San Jose, CA (US)

(72) Inventor: Stefan Bäurle, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 14/962,911

(22) Filed: Dec. 8, 2015

(51) Int. Cl.
  *H02M 3/335* (2006.01)
(52) U.S. Cl.
  CPC ............................. *H02M 3/33507* (2013.01)
(58) Field of Classification Search
  CPC ............... H02M 3/338; H02M 3/3385; H02M 3/33569; H02M 3/33507; H02M 3/335; H02M 3/33523; H02M 3/33592
  USPC ................ 363/18, 19–21.01, 21.04–21.11, 363/21.12–21.18, 97
  See application file for complete search history.

(56) References Cited

U.S. PATENT DOCUMENTS

| | | |
|---|---|---|
| 3,740,581 A | 6/1973 | Pfiffner |
| 4,777,580 A | 10/1988 | Bingham |
| 4,866,585 A | 9/1989 | Das |
| 4,871,686 A | 10/1989 | Davies |
| 4,875,151 A | 10/1989 | Ellsworth et al. |
| 4,972,237 A | 11/1990 | Kawai |
| 4,982,260 A | 1/1991 | Chang et al. |
| 5,008,794 A | 4/1991 | Leman |
| 5,072,268 A | 12/1991 | Rumennik |
| 5,164,891 A | 11/1992 | Keller |
| 5,258,636 A | 11/1993 | Rumennik et al. |
| 5,274,259 A | 12/1993 | Grabowski et al. |
| 5,282,107 A | 1/1994 | Balakrishnan |

(Continued)

FOREIGN PATENT DOCUMENTS

| | | |
|---|---|---|
| EP | 0975024 | 1/2000 |
| JP | 2003142698 | 5/2003 |

OTHER PUBLICATIONS

Popa et al., "Optimal Curvature-Compensated BiCMOS Bandgap Reference". Image and Signal Processing and Analysis, 2001, pp. 507-510, Fig. 2.

(Continued)

*Primary Examiner* — Nguyen Tran
(74) *Attorney, Agent, or Firm* — The Law Offices of Bradley J. Bereznak

(57) ABSTRACT

An energy storage circuit for use with a power converter includes a base capacitor coupled between an input bus and a ground potential, and an adjust capacitor. A switching device is coupled in series with the adjust capacitor between the input bus and the ground potential. A voltage regulator coupled between a control terminal of the switching device and ground. The voltage regulator has an input coupled to the second internal node, wherein when the power switch is turned on a signal at the second internal node is representative of a fluctuating input voltage. The voltage regulator is activated when the fluctuating input voltage is in a crest region, thereby turning the switching device off and disengaging the adjust capacitor. The voltage regulator is deactivated when the fluctuating input voltage is in a valley region, thereby turning the switching device on and engaging the adjust capacitor.

22 Claims, 3 Drawing Sheets

(56) References Cited

U.S. PATENT DOCUMENTS

| | | |
|---|---|---|
| 5,285,367 A | 2/1994 | Keller |
| 5,313,082 A | 5/1994 | Eklund |
| 5,323,044 A | 6/1994 | Rumennik et al. |
| 5,411,901 A | 5/1995 | Grabowski et al. |
| 5,510,972 A | 4/1996 | Wong |
| 5,612,567 A | 3/1997 | Baliga |
| 5,850,337 A | 12/1998 | Lee |
| 5,880,942 A * | 3/1999 | Leu .................. H02M 1/36 363/131 |
| 5,969,566 A | 10/1999 | Weber et al. |
| 6,084,277 A | 7/2000 | Disney et al. |
| 6,157,049 A | 12/2000 | Mitlehner et al. |
| 6,168,983 B1 | 1/2001 | Rumennik et al. |
| 6,207,994 B1 | 3/2001 | Rumennik et al. |
| 6,252,288 B1 | 6/2001 | Chang |
| 6,366,485 B1 | 4/2002 | Fujisawa |
| 6,424,007 B1 | 7/2002 | Disney |
| 6,445,600 B2 | 9/2002 | Ben-Yaakov |
| 6,465,291 B1 | 10/2002 | Disney |
| 6,468,847 B1 | 10/2002 | Disney |
| 6,489,190 B2 | 12/2002 | Disney |
| 6,501,130 B2 | 12/2002 | Disney |
| 6,504,209 B2 | 1/2003 | Disney |
| 6,509,220 B2 | 1/2003 | Disney |
| 6,549,439 B1 | 4/2003 | Yu |
| 6,552,597 B1 | 4/2003 | Disney |
| 6,555,873 B2 | 4/2003 | Disney et al. |
| 6,555,883 B1 | 4/2003 | Disney et al. |
| 6,563,171 B2 | 5/2003 | Disney |
| 6,570,219 B1 | 5/2003 | Rumennik et al. |
| 6,573,558 B2 | 6/2003 | Disney |
| 6,577,512 B2 | 6/2003 | Tripathi et al. |
| 6,583,663 B1 | 6/2003 | Disney |
| 6,633,065 B2 | 10/2003 | Rumennik et al. |
| 6,635,544 B2 | 10/2003 | Disney |
| 6,639,277 B2 | 10/2003 | Rumennik et al. |
| 6,661,276 B1 | 12/2003 | Chang |
| 6,667,213 B2 | 12/2003 | Disney |
| 6,680,646 B2 | 1/2004 | Disney |
| 6,724,041 B2 | 4/2004 | Rumennik et al. |
| 6,724,244 B2 | 4/2004 | Wu |
| 6,730,585 B2 | 5/2004 | Disney |
| 6,734,461 B1 | 5/2004 | Shiomi et al. |
| 6,734,714 B2 | 5/2004 | Disney |
| 6,750,105 B2 | 6/2004 | Disney |
| 6,759,289 B2 | 7/2004 | Disney |
| 6,768,171 B2 | 7/2004 | Disney |
| 6,768,172 B2 | 7/2004 | Rumennik et al. |
| 6,777,749 B2 | 8/2004 | Rumennik et al. |
| 6,781,198 B2 | 8/2004 | Disney |
| 6,787,437 B2 | 9/2004 | Rumennik et al. |
| 6,787,847 B2 | 9/2004 | Disney et al. |
| 6,798,020 B2 | 9/2004 | Disney et al. |
| 6,800,903 B2 | 10/2004 | Rumennik et al. |
| 6,815,293 B2 | 11/2004 | Disney et al. |
| 6,818,490 B2 | 11/2004 | Disney |
| 6,825,536 B2 | 11/2004 | Disney |
| 6,828,631 B2 | 12/2004 | Rumennik et al. |
| 6,838,346 B2 | 1/2005 | Disney |
| 6,865,093 B2 | 3/2005 | Disney |
| 6,882,005 B2 | 4/2005 | Disney et al. |
| 6,933,769 B2 | 8/2005 | Koelling |
| 6,987,299 B2 | 1/2006 | Disney et al. |
| 7,092,268 B2 | 8/2006 | George |
| 7,115,958 B2 | 10/2006 | Disney et al. |
| 7,135,748 B2 | 11/2006 | Balakrishnan |
| 7,193,402 B2 | 3/2007 | Lee et al. |
| 7,220,629 B2 | 5/2007 | Balakrishnan |
| 7,221,011 B2 | 5/2007 | Banerjee et al. |
| 7,221,128 B2 * | 5/2007 | Usui ................ H02M 3/33507 323/207 |
| 7,233,191 B2 | 6/2007 | Wang et al. |
| 7,253,042 B2 | 8/2007 | Disney |
| 7,253,059 B2 | 8/2007 | Balakrishnan |
| 7,295,451 B2 | 11/2007 | Charles |
| 7,301,389 B2 | 11/2007 | Soady |
| 7,335,944 B2 | 2/2008 | Banerjee |
| 7,348,830 B2 | 3/2008 | Debroux |
| 7,381,618 B2 | 6/2008 | Disney |
| 7,391,088 B2 | 6/2008 | Balakrishnan |
| 7,408,796 B2 | 8/2008 | Soldano |
| 7,459,366 B2 | 12/2008 | Banerjee |
| 7,468,536 B2 | 12/2008 | Parthasarathy |
| 7,494,875 B2 | 2/2009 | Disney |
| 7,557,406 B2 | 7/2009 | Parthasarathy |
| 7,585,719 B2 | 9/2009 | Balakrishnan |
| 7,595,523 B2 | 9/2009 | Parthasarathy et al. |
| 7,616,050 B2 | 11/2009 | Eckstein |
| 7,696,598 B2 | 4/2010 | Francis et al. |
| 7,741,788 B2 | 6/2010 | Ito et al. |
| 7,746,156 B1 | 6/2010 | Massie et al. |
| 7,760,524 B2 | 7/2010 | Matthews |
| 7,893,754 B1 | 2/2011 | Kung |
| 7,999,606 B2 | 8/2011 | Kung et al. |
| 8,115,457 B2 | 2/2012 | Balakrishnan et al. |
| 8,125,265 B2 | 2/2012 | Kung et al. |
| 8,278,994 B2 | 10/2012 | Kung et al. |
| 8,300,440 B2 | 10/2012 | Ho et al. |
| 8,373,356 B2 | 2/2013 | Shao et al. |
| 9,148,929 B2 | 9/2015 | Jiang et al. |
| 2001/0043480 A1 | 11/2001 | Shona |
| 2002/0125541 A1 | 9/2002 | Korec et al. |
| 2003/0201821 A1 | 10/2003 | Coady |
| 2004/0041622 A1 | 3/2004 | Wu |
| 2004/0061454 A1 | 4/2004 | Prasad |
| 2004/0109335 A1 | 6/2004 | Gan et al. |
| 2005/0035371 A1 | 2/2005 | Fujihira |
| 2005/0167749 A1 | 8/2005 | Disney |
| 2005/0212583 A1 | 9/2005 | Pai |
| 2005/0230745 A1 | 10/2005 | Fatemizadeh et al. |
| 2005/0242411 A1 | 11/2005 | Tso |
| 2006/0028779 A1 | 2/2006 | Bax et al. |
| 2007/0035286 A1 | 2/2007 | Lee et al. |
| 2007/0146020 A1 | 6/2007 | Williams |
| 2007/0211504 A1 | 9/2007 | Unkrich |
| 2008/0018261 A1 | 1/2008 | Kastner |
| 2008/0136350 A1 | 6/2008 | Tripathi et al. |
| 2008/0259653 A1 | 10/2008 | Baurle et al. |
| 2009/0016090 A1 | 1/2009 | Knight |
| 2009/0040795 A1 | 2/2009 | Park et al. |
| 2009/0120200 A1 | 5/2009 | Chakrabartty |
| 2009/0261790 A1 | 10/2009 | Arduini |
| 2010/0109561 A1 | 5/2010 | Chen et al. |
| 2011/0025278 A1 | 2/2011 | Balakrishnan et al. |
| 2011/0149615 A1 | 6/2011 | Matthews |
| 2012/0028083 A1 | 2/2012 | Jung |
| 2012/0074896 A1 | 3/2012 | Lui et al. |
| 2013/0020964 A1 | 1/2013 | Nuhfer et al. |
| 2014/0340065 A1 | 11/2014 | Svorc et al. |

OTHER PUBLICATIONS

Maleis: "Full-Wave Rectifier for CMOS IC chip". Reg. No. H64, May 6, 1986.

* cited by examiner

US 9,602,009 B1

LOW VOLTAGE, CLOSED LOOP CONTROLLED ENERGY STORAGE CIRCUIT

TECHNICAL FIELD

The present invention relates generally to energy storage circuits; more specifically, to circuits that utilize capacitors for storing energy in a power supply converter.

BACKGROUND

Many known AC-to-DC power converter circuits, also commonly referred to as switch mode power supplies, typically have three principal sections that perform distinct functions: input rectification, voltage reservoir (i.e., energy storage), and DC-to-DC conversion. The circuitry that performs input rectification changes the bidirectional input voltage from an AC line into rectified input voltage with current that flows only in one direction. Voltage reservoir circuitry is typically utilized to smooth out voltage fluctuations, also known as ripple voltage, of the rectified input voltage. The voltage reservoir circuitry provides a low ripple DC voltage to the input of the DC-to-DC conversion circuitry. DC-to-DC conversion is typically required to deliver a suitable output voltage needed to power electronic devices.

The energy storage function is typically performed by one or more capacitors coupled across the rectifier bridge. These capacitors are commonly referred to as a bulk capacitance. The bulk capacitance is charged by the rectified input current, thereby storing energy in the form of a voltage. The voltage on the bulk capacitance is typically too large and fluctuating to power the delicate circuitry of electronic equipment. Therefore, a DC-to-DC conversion circuit is utilized to convert the voltage across the bulk capacitance into a stable, low output voltage capable of powering electronic devices with high efficiency.

The rectified voltage on the bulk capacitance typically has a ripple that varies between a crest value and a valley value at a frequency that in a full bridge rectification is double the AC line frequency (e.g., 120 Hz). The crest value is defined by the peak voltage of the AC input voltage. The valley value is determined by the discharge rate of the bulk capacitor which is a function of the capacitance value and the amount of power demanded by the DC-to-DC converter. The ripple voltage amplitude is the difference between the crest and valley voltage levels. Persons of skill in the art understand that the DC-to-DC power converter needs a minimum rectified voltage at its input to produce the desired output power. Consequently, the ripple voltage amplitude should not exceed a certain value at the minimum AC input voltage specified for the power supply.

A power supply is typically required to provide its normally regulated output voltage for a short time (frequently referred to as the holdup time) after the AC input line voltage is removed. During the holdup time, the voltage input to the DC-to-DC power converter is provided entirely by the stored energy in the bulk capacitance, which is proportional to the bulk capacitance value and the square of the voltage on the bulk capacitance.

The individual capacitors that make up the bulk capacitance are typically selected to meet several requirements that are influenced by the intended use of the power supply. The physical size of the power supply is influenced by the value and the voltage rating (the maximum voltage that an individual capacitor can reliably withstand) of the capacitors that constitute the bulk capacitance. The cost of the bulk capacitance is also a significant part of the total cost of the power supply. For a given value of capacitance, a higher voltage rating translates to higher cost. The voltage rating is selected for reliable operation at the maximum AC input voltage of the power supply, whereas the capacitance of the individual capacitors is selected based on the minimum specified AC input voltage of the power supply.

The total bulk capacitance value is typically selected to ensure that the minimum input voltage required for proper DC-to-DC conversion is not reached when the power supply is operating with the minimum specified AC input line voltage. Typically, AC-to-DC power supplies are designed to operate from a wide range of AC input line voltages, e.g., between 85 volts AC and 265 volts AC. Consequently, the bulk capacitance usually includes a physically large capacitor, which provides a high capacitance value required by the minimum AC input voltage requirement of the DC-to-DC power convertor, as well having a high voltage rating (e.g., 400 V) that exceeds the rectified maximum AC input line voltage.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
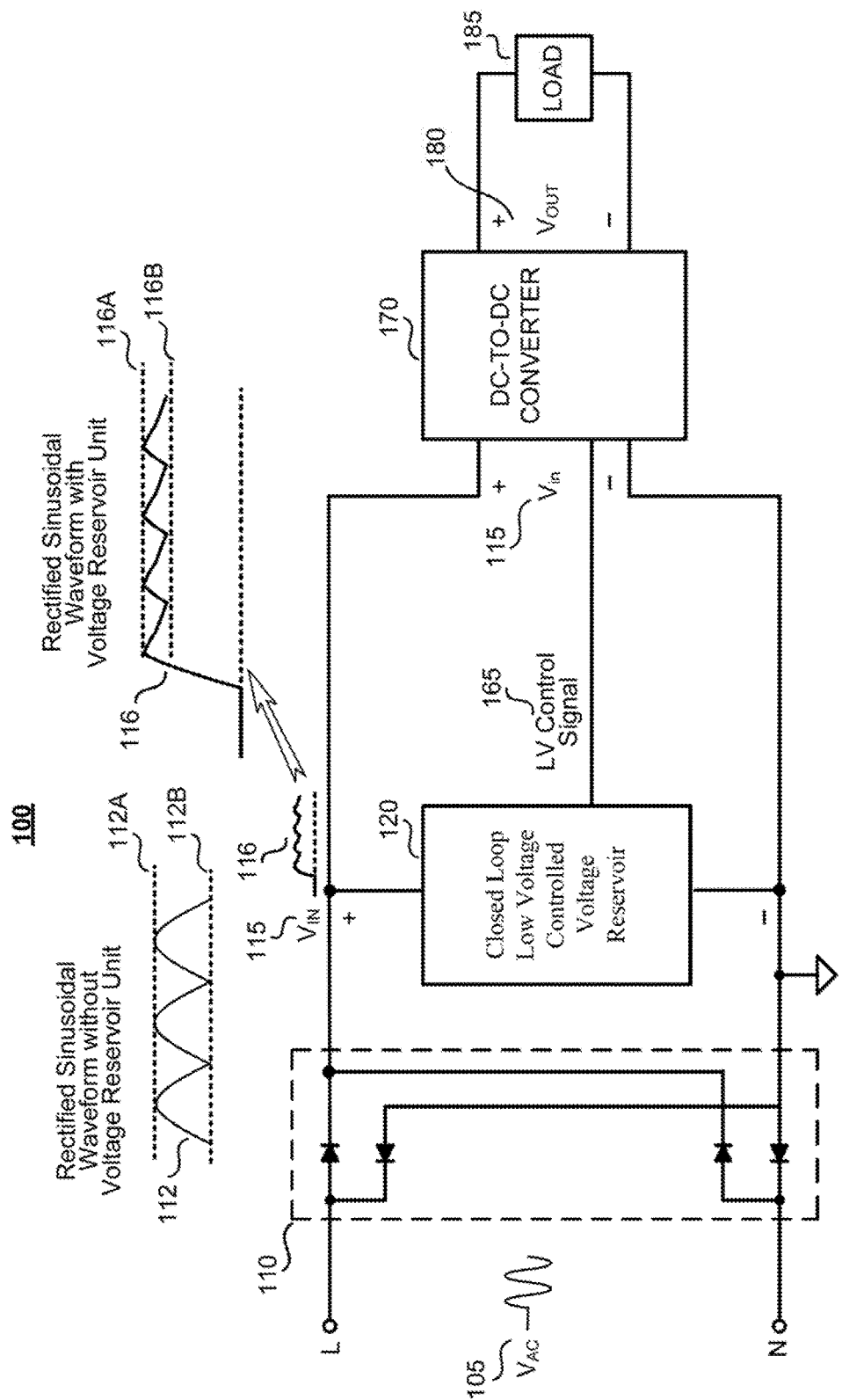
FIG. 1 is a circuit block diagram of an example switch mode power supply that includes a closed loop, low voltage controlled energy storage circuit.

Corresponding reference characters indicate corresponding components throughout the several views of the drawings. Skilled artisans will appreciate that elements in the figures are illustrated for simplicity and clarity and have not necessarily been drawn to scale. In addition, it is appreciated that the figures provided herewith are for explanation purposes to persons ordinarily skilled in the art and that the drawings are not necessarily drawn to scale.

DETAILED DESCRIPTION

In the following description numerous specific details are set forth, such as device types, voltages, component values, configurations, etc., in order to provide a thorough understanding of the embodiments described. However, persons having ordinary skill in the relevant arts will appreciate that these specific details may not be needed to practice the embodiments described. It is further appreciated that well known circuit structures and elements have not been described in detail, or have been shown in block diagram form, in order to avoid obscuring the embodiments described.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. Particular features, structures or characteristics may be included in an integrated circuit, an electronic circuit, a combinational logic circuit, or other suitable components that provide the described functionality.

In the context of the present application, when a transistor is in an "off state" or "off" the transistor does not substantially conduct current. Conversely, when a transistor is in an "on state" or "on" the transistor is able to substantially conduct current. By way of example, in one embodiment, a transistor comprises an N-channel metal-oxide-semiconductor field-effect transistor (NMOS) with a voltage being supported between the first terminal, a drain, and the second terminal, a source. The MOSFET comprises a switch that is driven by a control circuit. For purposes of this disclosure, "ground" or "ground potential" refers to a reference voltage or potential against which all other voltages or potentials of an electronic circuit or Integrated circuit (IC) are defined or measured.

The present disclosure is directed to the use of capacitors to store energy in AC-to-DC power supplies. In particular, a closed loop voltage reservoir (energy storage) circuit is provided that offers lower cost and reduced physical volume of the bulk capacitor utilized as the voltage reservoir. In one embodiment, the energy storage circuit allows a power supply to operate across a specified range of AC input line voltage with increased efficiency. The energy storage circuit is controlled by a signal extracted from a low voltage source generated in a DC-to-DC power converter responsive to fluctuations in the rectified AC input line voltage. As a result of auto adjustment, the capacitance of the energy storage circuit is dynamically increased around the valley region of the rectified AC input line voltage, and dynamically reduced around the crest region of the rectified AC input line voltage. In one implementation, the control signal for the closed loop adjustment of the energy storage circuit is generated in a manner that eliminates power loss ordinarily associated with a sense voltage divider, thereby increasing the overall efficiency and decreasing no-load input power of the power supply.

FIG. 1 shows an example switch mode power supply 100 that includes a full bridge rectifier 110 comprising four diodes that convert an externally-generated ac bidirectional sinusoidal input line voltage $V_{AC}$ 105 into a fully rectified unidirectional voltage. The fully rectified unidirectional voltage coupled across a voltage reservoir unit (closed loop, low voltage controlled energy storage circuit), hereafter referred as "energy storage circuit" 120, generates a low fluctuation (substantially smooth) DC voltage $V_{IN}$ 115, which is presented by the symbolic waveform 116. In one example, the ac input voltage may be an ordinary ac line voltage (e.g., 85V-265V between 50-60 Hz). The DC voltage $V_{IN}$ 115 is provided at the input of the DC-to-DC power converter 170. The DC-to-DC power converter 170 could be of any known topology that regulates the input voltage $V_{IN}$ 115 to a desired DC output voltage level, $V_{OUT}$ 180 applied to a load 185.

Energy storage circuit 120 functions as a compensating filter in response to input voltage fluctuations of the fully rectified waveform signal. That is, in the absence of energy storage circuit 120, a fully rectified sinusoidal waveform of 112 is generated by bridge circuit 110. The instantaneous values of a fully rectified sinusoidal waveform shows dramatic fluctuations between a peak voltage value 112A and the zero reference potential 112B. Energy storage circuit 120 produces a DC voltage with small fluctuations during steady state operation. Depending on the bulk capacitance value of energy storage circuit 120, and the peak voltage value 112A of the line voltage, DC voltage $V_{IN}$ 115 may fluctuate between a crest voltage value 116A and a valley voltage value 116B. The crest and valley values define the amplitude of the ripple (e.g., 120 Hz frequency) of voltage $V_{IN}$ 115 input to DC-to-DC power converter 170.

Figure 2:
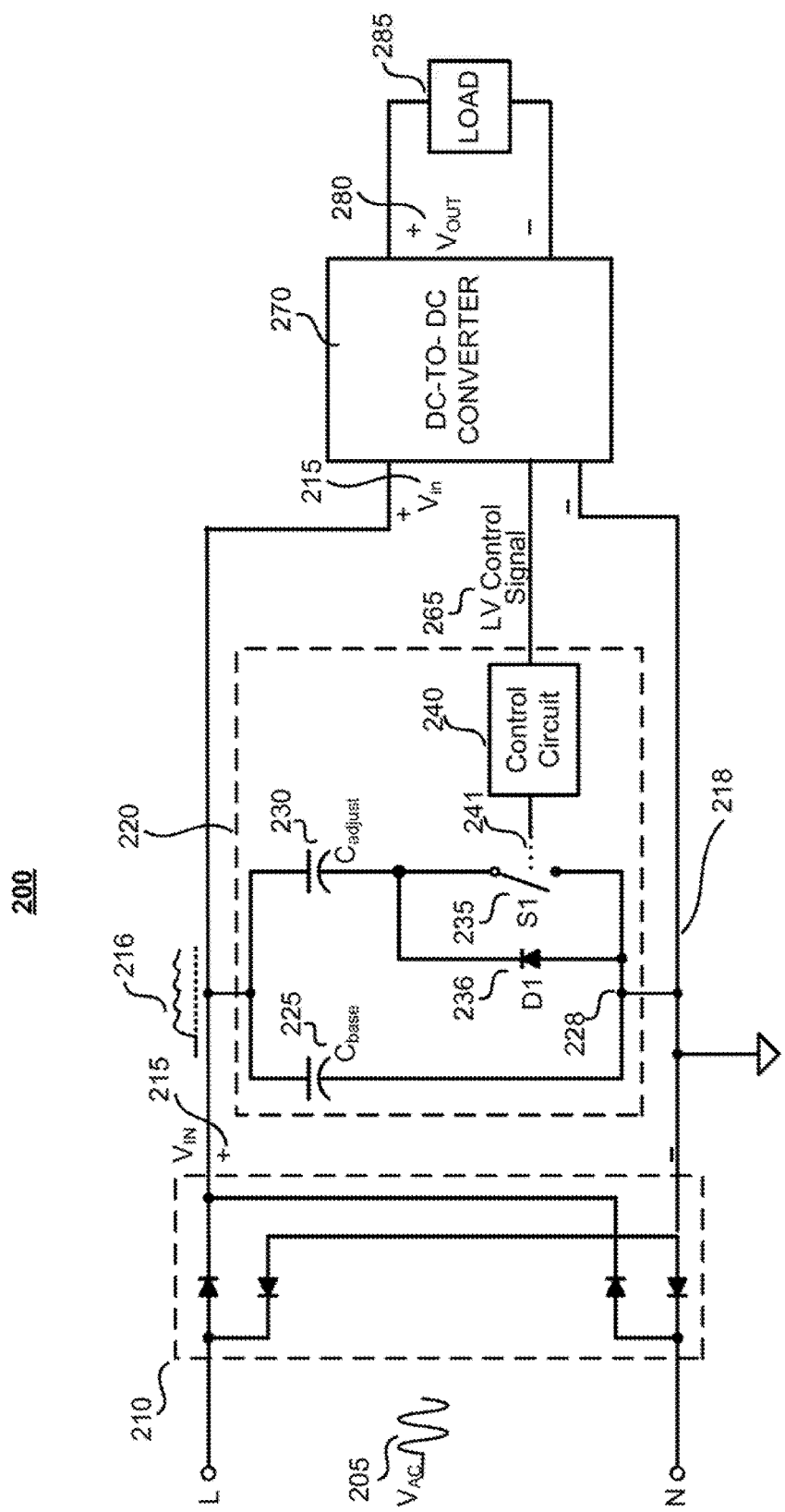
FIG. 2 is a circuit schematic diagram of the switch mode power supply of FIG. 1 showing details of an example closed loop, low voltage controlled energy storage circuit.

FIG. 2 is a circuit schematic diagram of a switch mode power supply 200 coupled to receive an externally-provided AC supply line voltage $V_{AC}$ 205 at a pair input terminals of a rectifier bridge 210. Rectification produces a voltage $V_{IN}$ 215 across an energy storage circuit 220. Voltage $V_{IN}$ 215 is also input to DC-to-DC power converter 270. As shown, energy storage circuit 220 includes a base capacitor $C_{base}$ 225 having a capacitance value and voltage rating selected for reliable operation at the maximum AC input voltage of the power supply.

Energy storage circuit 220 is also shown including an adjust capacitor $C_{adjust}$ 230 coupled in parallel with $C_{base}$ 225 through a series switching device S1 235. When switching device S1 235 is closed, $C_{base}$ 225 is connected in parallel with $C_{adjust}$ 230 between ground 218 and the positive input node of DC-to-DC power converter 270. The diode D1 236, which is shown coupled between ground 218 and the cathode of $C_{adjust}$ 230, allows current to flow through capacitor $C_{adjust}$ 230 in one direction only (unidirectional current through switching device S1 335) and cannot charge when switching device S1 235 is open. However, it can discharge when the switching device S1 335 is either open or closed. Switching device S1 235 is closed for a limited duration in each half line cycle around the valley region of the line cycle when the rectified input voltage has dropped below a predefined threshold value.

As configured in the example of FIG. 2, capacitor $C_{base}$ 225 receives a charging current from rectifier bridge 210 at all times during normal operation. $C_{adjust}$ 230 only receives charging current from rectifier bridge 210 when switching device S1 235 is closed. In one implementation, capacitor $C_{adjust}$ 230 is a low voltage capacitor having a relatively large capacitance to keep the valley of voltage $V_{IN}$ 215 from dropping below a minimum desired value. Capacitor $C_{base}$ 225, on the other hand, is a high voltage capacitor (i.e., high voltage rating) having a relatively small capacitance. In one embodiment, a capacitance ratio of $C_{adjust}$ 230 to a $C_{base}$ 225 is greater than 2:1.

In the embodiment of FIG. 2, switching device S1 235 is controlled in a closed loop manner through control circuit 240. Control circuit 240 is driven by a low voltage (LV) control signal 265 from an internal supply in DC-to-DC power converter 270 in response to fluctuations in the input voltage $V_{IN}$ 215, as shown by waveform 216. DC-to-DC power converter 270 receives the input voltage $V_{IN}$ 215 and generates the regulated DC voltage $V_{OUT}$ 280 having a desired voltage level and low amplitude of the low frequency ripple at the output across the load 285.

Figure 3:
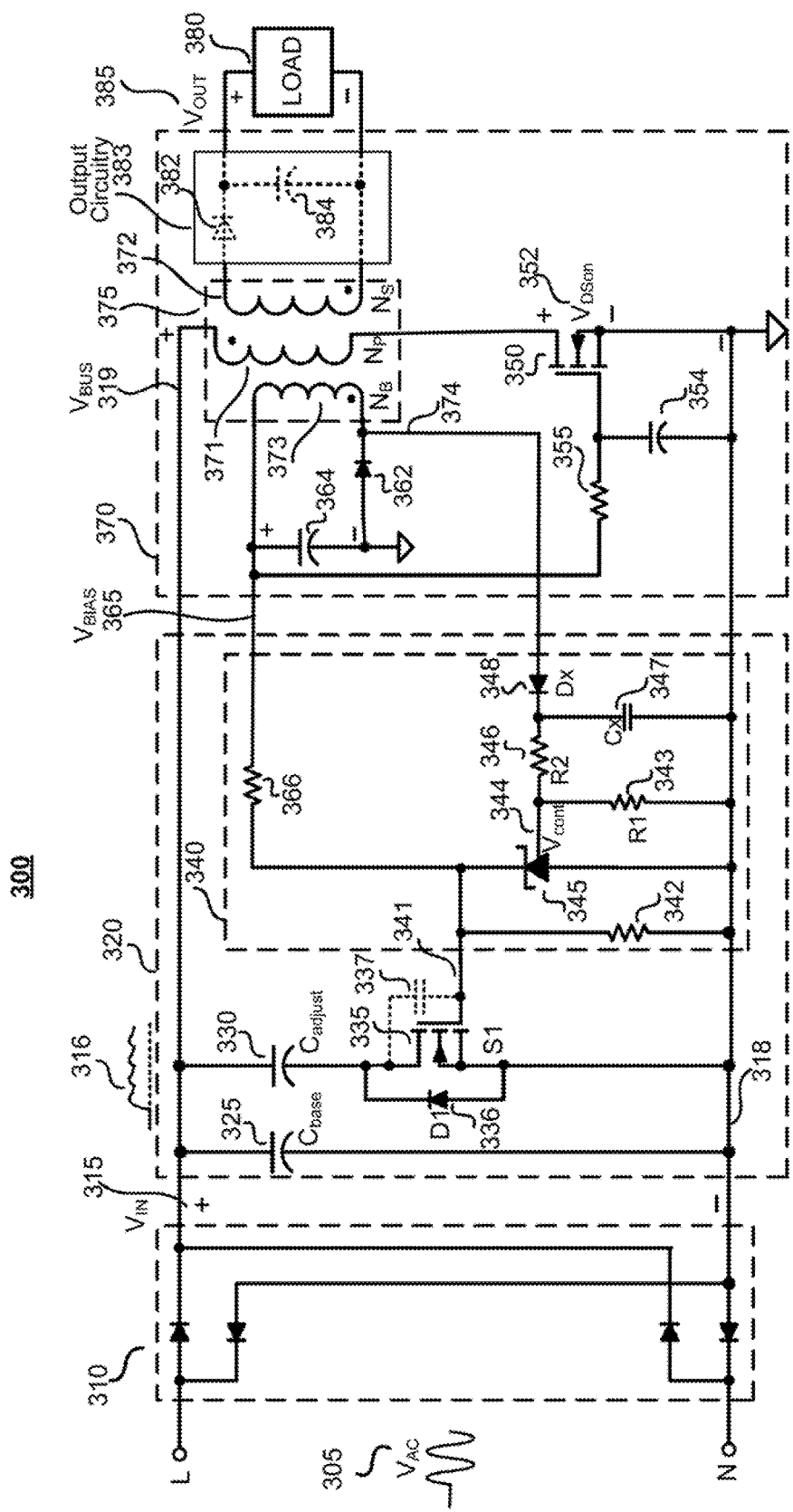
FIG. 3 is a detailed circuit schematic diagram of another example switch mode power supply with a closed loop, low voltage controlled energy storage circuit.

FIG. 3 is a detailed circuit schematic diagram of another example switch mode power supply 300 with a closed loop, low voltage controlled energy storage circuit 320. Power supply 300 also includes a DC-to-DC converter 370, which, in this example, is shown as a flyback converter with a low voltage bias winding 373 that is utilized to generate a low voltage DC supply $V_{BIAS}$ 365 coupled to control circuit 340. It is appreciated that other DC-to-DC converter topologies may be utilized to provide a low voltage supply in response to the input line voltage instantaneous value going below a predefined threshold.

Power supply 300 further includes a rectifier bridge 310 that receives AC supply voltage $V_{AC}$ 305 and generates, rectified input voltage $V_{IN}$ 315 therefrom. Rectified input voltage $V_{IN}$ 315 is provided to energy storage circuit 320. Energy storage circuit 320 includes a base high voltage capacitor $C_{base}$ 325 that may define a minimum required value for the holding time of the power supply. Capacitor $C_{base}$ 325 is coupled to receive charging current from rectifier bridge 310. Low voltage adjust capacitor $C_{adjust}$ 330 is selectively coupled in parallel with $C_{base}$ 325 through a series switching device S1 335 during the valley region in each half line cycle when the rectified input voltage has dropped below a predefined threshold value. Diode D1 336 allows unidirectional current across switching device S1 335. Hence, the low voltage capacitance $C_{adjust}$ 330 cannot charge when the switching device S1 335 is open, although it can discharge when the switching device S1 335 is either open or closed.

In the example shown, switching device S1 335 comprises an n-channel MOSFET having gate, source, and drain terminals. As shown, the gate of S1 335 is coupled to resistors 342 and 366, the drain is coupled to the cathode of diode D1 336 and to negative terminal of $C_{adjust}$ 330, and the source connected to anode of diode D1 336 and to ground 318.

In one embodiment the closed loop control signal 341 for the series switching device S1 335 is provided through a low voltage DC supply $V_{BIAS}$ 365 and is controlled through a control circuit 340. In one implementation, control signal 341 is generated through the low voltage supply of DC bias $V_{BIAS}$ 365 through a voltage divider formed by resistors 366 and 342, which are commonly connected to the gate of MOSFET S1 335. A voltage regulator 345 is shown connected between the gate of S1 335 and ground 318. The signal 341 input to the gate of S1 335 is controlled in closed loop by control circuit 340, which, in the example shown, generates a voltage control signal $V_{cont}$ 344 through a bias winding on transformer 375 of the DC-to-DC power converter 370.

In the embodiment of FIG. 3, DC-to-DC power converter 370 is shown as a flyback power converter; however, persons of skill in the art will appreciate that the power supply disclosed herein may utilize any other topology of DC-to-DC power converter, such as boost, forward, or other power converter topologies that provide an internal low voltage supply for control circuit 340.

As shown, DC-to-DC power converter 370 includes an isolation transformer 375 with a primary winding $N_P$ 371 coupled to the input bus having a voltage $V_{BUS}$ 319, which in a flyback converter configuration may, be the same as input voltage $V_{IN}$ 315. A power switch 350, which is shown coupled in series with primary winding 371, controls the transfer of energy from primary/input circuit to the output of power converter $V_{OUT}$ 385 and to the load 380 through the secondary winding $N_S$ 372 and the output circuitry 382.

An auxiliary/bias winding $N_B$ 373 on the core of isolation transformer 375 is coupled through a rectified diode 362 and a bulk bias capacitor 364 that generates a low voltage DC $V_{BIAS}$ 365 that may be utilized through an RC noise filter circuit (i.e., R 355 and C 354) to enable a switch controller 356. It is appreciated that switch controller 356 may receive multiple signals (not shown) to generate a switching signal to turn on/off power switch 350 of DC-to-DC power converter 370. In addition to providing the switching signal for power switch 350, the low voltage DC $V_{BIAS}$ 365 may also be utilized to generate control signal 341 that controls switching device S1 335. When switching device S1 335 is turned on, capacitor $C_{adjust}$ 330 is coupled in parallel with capacitor $C_{base}$ 325 for an efficient and local compensation of the voltage drop in each half line cycle only during the valley region of the rectified AC line voltage 305.

Practitioners in the art understand that when power switch 350 is turned on (i.e., conducting) current flows through primary winding 371. Due to the reverse winding direction of secondary winding 372 and the reverse bias of the output rectifier 382 no current/energy is transferred through output circuitry 383 to load 380. In this mode of operation load current is supplied through the output bulk capacitor 384.

It is appreciated that the fluctuating input voltage $V_{IN}$ 315 may be sensed through the AC induced voltage in auxiliary/bias winding 373 at node 374. When the power switch 350 is turned on (i.e., on-state) the current induced in auxiliary/bias winding 373 represents the instantaneous value of the input voltage $V_{IN}$ 315. During the time that power switch 350 is on, current flowing through auxiliary/bias winding 373 does not charge bias capacitor 364 due to the reverse direction of bias rectifier 362. Hence, bias current is conducted from node 374 through diode rectifier Dx 348 of control circuit 340. The signal at node 374 is representative of the fluctuating input voltage $V_{IN}$ 315 (symbolic waveform 316), which voltage charges capacitor Cx 347, and through the resistive divider formed by resistors R1 343 and R2 346 generates a control, signal on the control terminal $V_{cont}$ 344 of voltage regulator 345. In one embodiment, voltage regulator 345 is a three terminal shunt regulator (e.g., a TL431 regulator) utilized to turn on/off switching device S1 335, thereby engaging and disengaging capacitor $C_{adjust}$ 330 in energy storage circuit 320.

In operation, when power switch 350 turns off, the energy stored in the primary winding 371 transferred through the output rectifier 382 to output $V_{OUT}$ 385 and load 380. At the same time, the reversed direction of current in the bias winding 373 conducts current through the bias rectifier 382 to charge bulk bias capacitor 364, thereby generating DC bias voltage $V_{bias}$ 365. DC bias voltage $V_{bias}$ 365 provides supply for the switch controller 356 through RC noise filter R 355 and C 354 to generate the control signal (gating signal) for power switch 350. DC bias voltage $V_{bias}$ 365 is also applied through resistor 366 to provide a regulated control/gating signal 341 for switching device S1 (e.g., MOSFET) 335. When MOSFET 335 is conducting, capacitor $C_{adjust}$ 330 is engaged in energy storage circuit 320.

Persons of skill in the art will appreciate that the dashed capacitor 337 symbolizes the Miller capacitance between drain and gate of MOSFET 335. Resistor 342 provides a discharge path for the total gate capacitance of MOSFET 335. Note that diode D1 336 coupled across switching device S1 335 is also coupled to $C_{adjust}$ 330 (low voltage capacitance) and to $C_{base}$ 325 (high voltage capacitance) through the common input return (ground) 318. Diode D1 336 allows current to pass only in one direction when switching device S1 335 is open. Hence, low voltage capacitor $C_{adjust}$ 330 cannot be charged when the switching device S1 335 is open; however, $C_{adjust}$ 330 can discharge when the switching device S1 335 is either open or closed.

Continuing with the example of FIG. 3, the voltage across capacitor Cx 347 and the resistive divider R1 343 and R2 346 provides the control signal on the control terminal $V_{cont}$ 344 of voltage regulator 345. The voltage across capacitor Cx 347 may be calculated from the primary winding voltage, $V_P = (V_{BUS} - V_{DSon})$, the bias winding voltage when diode 362 is not conducting, $V_P (N_B/N_P)+V_{BIAS}$, and the forward drop of diode $D_X$, as shown below.

$$V_{Cx}=(N_B/N_P)(V_{BUS}-V_{DSon})+V_{BIAS}-V_{Dx(FWD)};$$

The control signal $V_{cont}$ 344 is calculated as: $V_{cont}=V_{Cx}$ R1/(R1+R2).

Around the crest area of the fluctuating input voltage $V_{IN}$ 315 the voltage $V_{Cx}$ 349 across capacitor Cx 347 and the control voltage $V_{cont}$ 344 on control terminal 344 of voltage regulator 345 remain high to activate voltage regulator 345 and pull down the voltage on the control terminal (gate) of MOSFET 335 below its turn-on threshold, which keeps MOSFET 335 turned off (i.e., off-state). However, during the valley region of the fluctuating input voltage $V_{IN}$ 315 the voltage $V_{Cx}$ 349 and the control voltage $V_{cont}$ 344 drop below the turn-on threshold of voltage regulator 345 causing regulator 345 to be in an off-state. When voltage regulator 345 is turned-off, voltage at the gate of MOSFET 335 (signal 341) is pulled up through resistor 366 to the bias voltage $V_{BIAS}$ 365 which causes MOSFET 335 to turn on, thereby coupling capacitor $C_{adjust}$ 330 in parallel with capacitor $C_{base}$ 325.

The above description of illustrated example embodiments, including what is described in the Abstract, are not intended to be exhaustive or to be limitation to the precise forms or structures disclosed. While specific embodiments and examples of the subject matter described herein are for illustrative purposes, various equivalent modifications are possible without departing from the broader spirit and scope of the present invention. Indeed, it is appreciated that the specific example currents, voltages, resistances, capacitances, etc., are provided for explanation purposes and that other values may also be employed in other embodiments and examples in accordance with the teachings of the present invention.

I claim:

1. An energy storage circuit for use with a power converter, the power converter having an energy transfer element that receives a fluctuating input voltage produced from a rectified AC input line voltage, the fluctuating input voltage being provided on an input bus coupled to a primary side of the energy transfer element, the energy transfer element having an output side that delivers an output signal to a load, a power switch being coupled to the primary side of the energy transfer element for regulating a transfer of energy to the output signal delivered to the load, a bias supply of the energy transfer element being coupled between first and second nodes, the bias supply producing a bias voltage at the first node, the energy storage circuit comprising:
   a base capacitor coupled between the input bus and a ground potential, the base capacitor having a first capacitance;
   an adjust capacitor having a second capacitance;
   a switching device coupled in series with the adjust capacitor between the input bus and the ground potential; and
   a control circuit that includes a voltage regulator having first and second terminals respectively coupled to a control terminal of the switching device and the ground potential, the control circuit further including a resistor coupled between the first node and the control terminal, the voltage regulator further having an input coupled to the second node,
   wherein during normal operation when the power switch is turned on a signal at the second node is representative of the fluctuating input voltage, the voltage regulator being activated when the fluctuating input voltage is in a crest region thereby turning the switching device off and disengaging the adjust capacitor, the voltage regulator being deactivated when the fluctuating input voltage is in a valley region, thereby turning the switching device on and engaging the adjust capacitor, such that when the adjust capacitor is engaged a total capacitance of the energy storage circuit is equal to a sum of the first and second capacitances.

2. The energy storage circuit of claim 1 wherein the first capacitance is relatively small as compared to the second capacitance.

3. The energy storage circuit of claim 2 wherein a ratio of the second capacitance to the first capacitance is 2:1 or greater.

4. The energy storage circuit of claim 1 wherein the base capacitor has a relatively high voltage rating as compared to the adjust capacitor.

5. The energy storage circuit of claim 2 wherein the first capacitance is determined by a holdup time of the power converter.

6. The energy storage circuit of claim 1 wherein the power converter is a DC-to-DC power converter.

7. The energy storage circuit of claim 1 wherein the power converter is a DC-to-DC flyback power converter.

8. The energy storage circuit of claim wherein the total capacitance is determine by a minimum specified valley voltage of the fluctuating input voltage.

9. The energy storage circuit of claim 1 wherein the control circuit further includes a charging capacitor coupled to the second node and to the input of the voltage regulator, in the valley region of the fluctuating input voltage a voltage on the charging capacitor dropping below a turn-on threshold of the voltage regulator.

10. The energy storage circuit of claim 9 wherein the charging capacitor is coupled to the input of the voltage regulator through a resistor divider.

11. The energy storage circuit of claim 1 wherein the switching device is a MOSFET.

12. A power converter comprising:
   an energy transfer element having a primary side that receives a fluctuating input voltage produced from a rectified AC input line voltage, the fluctuating input voltage being provided on an input bus, the energy transfer element also having a bias supply coupled between first and second nodes, the bias supply producing a bias voltage at the first node, and an output side that delivers an output signal to a load;
   a power switch coupled to the primary side for regulating a transfer of energy to the output signal delivered to the load;
   a base capacitor coupled between the input bus and a ground potential, the base capacitor having a first capacitance;
   an adjust capacitor having a second capacitance;
   a switching device coupled in series with the adjust capacitor between the input bus and the ground potential; and
   a control circuit that includes a voltage regulator having first and second terminals respectively coupled to a control terminal of the switching device and the ground potential, the control circuit further including a resistor coupled between the first node and the control terminal, the voltage regulator further having an input coupled to the second node,
   wherein during normal operation when the power switch is turned on a signal at the second node is representative of the fluctuating input voltage, the voltage regulator being activated when the fluctuating input voltage is in a crest region thereby turning the switching device off and disengaging the adjust capacitor, the voltage regulator being deactivated when the fluctuating input voltage is in a valley region, thereby turning the switching device on and engaging the adjust capacitor, such that when the adjust capacitor is engaged a total capacitance of the energy storage circuit is equal to a sum of the first and second capacitances.

13. The energy storage circuit of claim 12 wherein the first capacitance is relatively small as compared to the second capacitance.

14. The power converter of claim 13 wherein a ratio of the second capacitance to the first capacitance is 2:1 or greater.

15. The power converter of claim 12 wherein the base capacitor has a relatively high voltage rating as compared to the adjust capacitor.

16. The power converter of claim 12 wherein the first capacitance is determined by a holdup time of the power converter.

17. The power converter of claim 12 wherein the power converter is a DC-to-DC power converter.

18. The power converter of claim 12 wherein the power converter is a DC-to-DC flyback power converter.

19. The power converter of claim 12 wherein the total capacitance is determined by a minimum specified valley voltage of the fluctuating input voltage.

20. The power converter of claim 12 wherein the control circuit further includes a charging capacitor coupled to the second node and to the input of the voltage regulator, in the valley region of the fluctuating input voltage a voltage on the charging capacitor dropping below a turn-on threshold of the voltage regulator.

21. The power converter of claim 20 wherein the charging capacitor is coupled to the input of the voltage regulator through a resistor divider.

22. The power converter of claim 12 wherein the switching device is a MOSFET.

* * * * *